United States Patent
Jia et al.

(10) Patent No.: US 10,707,999 B1
(45) Date of Patent: Jul. 7, 2020

(54) SPACE TIME BLOCK CODES FOR SEMI-ORTHOGONAL MULTI-ACCESS BASED WLAN SYSTEMS

(71) Applicants: Jia Jia, Shenzhen (CN); Alireza Bayesteh, Kanata (CA); Jung Hoon Suh, Ottawa (CA); Osama Aboul-Magd, Kanata (CA); Kwok Shum Au, Ottawa (CA)

(72) Inventors: Jia Jia, Shenzhen (CN); Alireza Bayesteh, Kanata (CA); Jung Hoon Suh, Ottawa (CA); Osama Aboul-Magd, Kanata (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/221,150

(22) Filed: Dec. 14, 2018

(51) Int. Cl.
*H04L 1/06* (2006.01)
*H04L 27/34* (2006.01)
*H04L 1/00* (2006.01)
*H04B 17/336* (2015.01)

(52) U.S. Cl.
CPC .......... *H04L 1/0643* (2013.01); *H04L 1/0071* (2013.01); *H04L 1/0612* (2013.01); *H04L 1/0668* (2013.01); *H04L 27/3494* (2013.01); *H04B 17/336* (2015.01)

(58) Field of Classification Search
CPC . H04L 1/0643; H04L 27/3494; H04L 1/0612; H04L 1/0668; H04L 1/0071; H04B 17/336

USPC .................................................. 375/260, 267
See application file for complete search history.

(56) References Cited

U.S. PATENT DOCUMENTS

| | | | |
|---|---|---|---|
| 7,664,194 | B2 | 2/2010 | Horng et al. |
| 8,325,840 | B2 | 12/2012 | Bursalioglu et al. |
| 9,614,711 | B2 | 4/2017 | Zhu et al. |
| 9,692,559 | B1 | 6/2017 | Zhang et al. |
| 9,866,364 | B2 | 1/2018 | Jia et al. |

(Continued)

OTHER PUBLICATIONS

Idd Pazi Alli, Channel Estimation in Mobile Wireless Systems, Master's Degree Project, KTH School of Electrical Engineering (EES), 2015, Stockholm, Sweden.

*Primary Examiner* — Fitwi Y Hailegiorgis
(74) *Attorney, Agent, or Firm* — BCF LLP (57) ABSTRACT

The disclosed systems, structures, and methods are directed to a wireless local area network (WLAN) transmission architecture and transmitting methodology that combines space-time block code (STBC) encoding techniques with semi-orthogonal multiple access (SOMA) schemes to improve throughput rate performance for lower signal strength data. The transmission architecture and method includes a data processing module that is configured to digitally process and format data produced by two wireless stations. A SOMA constellation quadrature encoding module operates to apply quadrature-based modulation to the processed data and map the data to a modulation constellation based on data signal strength and data bit reliability. An STBC encoding module is configured to block encode the SOMA modulated data with orthogonal codes to produce STBC-based SOMA-symbol data having time and space diversity properties that improve throughput performance at lower signal strength levels.

20 Claims, 10 Drawing Sheets

(56) References Cited

U.S. PATENT DOCUMENTS

| | | |
|---|---|---|
| 2016/0119171 A1 | 4/2016 | Suh et al. |
| 2016/0204969 A1 | 7/2016 | Zhu et al. |
| 2017/0180097 A1 | 6/2017 | Zhu et al. |
| 2017/0208625 A1* | 7/2017 | Choi .................. H04W 74/0808 |
| 2018/0139080 A1* | 5/2018 | Kim ...................... H04L 1/0643 |
| 2019/0182095 A1 | 6/2019 | Suh et al. |

* cited by examiner

STBC Decoding Process

250

2 RX case

The received signal by RX0 at $t_0$ is $y_{00}$ and at $t_1$ is $y_{10}$:
$$\begin{cases} y_{00} = s_0 \times h_{00} - s_1^* \times h_{01} \\ y_{10} = s_1 \times h_{00} + s_0^* \times h_{01} \end{cases}$$
The received signal by RX1 at $t_0$ is $y_{01}$ and at $t_1$ is $y_{11}$:
$$\begin{cases} y_{01} = s_0 \times h_{10} - s_1^* \times h_{11} \\ y_{11} = s_1 \times h_{10} + s_0^* \times h_{11} \end{cases}$$
It yields:
$$\begin{cases} \tilde{s}_0 = h_{00}^* \times y_{00} + h_{01} \times y_{10}^* + h_{10}^* \times y_{01} + h_{11} \times y_{11}^* \\ \tilde{s}_1 = h_{10}^* \times y_{11} - h_{11} \times y_{01}^* + h_{00}^* \times y_{10} - h_{01} \times y_{00}^* \end{cases}$$

1 RX case

The received signal at $t_0$ is $y_0$ and at $t_1$ is $y_1$:
$$\begin{cases} y_0 = s_0 \times h_{tx0} - s_1^* \times h_{tx1} \\ y_1 = s_1 \times h_{tx0} + s_0^* \times h_{tx1} \end{cases}$$

It yields:
$$\begin{cases} \tilde{s}_0 = h_{tx0}^* \times y_0 + h_{tx1} \times y_1^* \\ \tilde{s}_1 = -h_{tx1} \times y_0^* + h_{tx0}^* \times y_1 \end{cases}$$

SPACE TIME BLOCK CODES FOR SEMI-ORTHOGONAL MULTI-ACCESS BASED WLAN SYSTEMS

FIELD OF THE INVENTION

The present invention generally relates to the field of wireless local area networks (WLANs) and, in particular, to systems and methods directed to applying space-time block codes (STBC) to semi-orthogonal multi-access (SOMA)-based WLAN architectures to improve throughput of lower signal-to-noise (SNR) signals.

BACKGROUND

Various proposals have been presented regarding the improvement of service capabilities for existing and next-generation wireless communication systems, including wireless local area network (WLAN) platforms in accordance with the Institute of Electrical and Electronics Engineers (IEEE) 802.11 standards.

Some improvements call for the realization of higher data rates and increased channel throughput and in an effort to address these goals, certain schemes provide for the increased implementation of multiple-input, multiple-output (MIMO) and massive-MIMO (M-MIMO) receiver architectures for WLAN communications. However, MIMO/M-MIMO receivers may, under certain conditions, exhibit limitations regarding the reliable support of higher data rates and increased channel throughput.

To this end, the use of semi-orthogonal multiple access (SOMA) schemes in conjunction with MIMO-based receiver architectures has been proposed to address the reliability issues of WLAN high throughput processing. Such MIMO-based SOMA schemes have demonstrated meaningful throughput improvement at higher signal-to-noise ratio (SNR) levels.

SUMMARY

An object of the present disclosure is to provide a wireless local area network (WLAN) transmission architecture that combines space-time block code (STBC) encoding techniques with semi-orthogonal multiple access (SOMA) schemes to improve throughput rate performance for lower signal strength data. The transmission architecture includes a data processing module that is configured to digitally process and format data produced by two wireless stations. A space-time block code (STBC) encoding module encodes the processed data with orthogonal block codes to produce orthogonal block-encoded symbol data having time and space diversity properties. A semi-orthogonal multiple access (SOMA) encoding module operates to apply quadrature-based modulation constellation mapping to the orthogonal block-encoded symbol data and to the processed data, based on data signal strength and data bit reliability, to produce STBC-based SOMA-symbol data.

In accordance with other aspects of the present disclosure, there is provided a related methodology for transmitting data in a wireless local area network (WLAN) that combines space-time block code (STBC) encoding techniques with semi-orthogonal multiple access (SOMA) schemes to improve throughput rate performance for lower signal strength data. The transmitting method includes digitally processing and formatting data generated by a first and second wireless station. The transmitting method then applies space-time block code (STBC) to the processed data to produce orthogonal block-encoded symbol data having time and space diversity properties. The method further applies semi-orthogonal multiple access (SOMA) encoding to the orthogonal block-encoded symbol data and to the processed data, the SOMA encoding providing quadrature-based modulation constellation mapping to the orthogonal block-encoded symbol data and to the processed data, based on data signal strength and data bit reliability, to produce STBC-based SOMA-symbol data.

In accordance with other objects of the present disclosure, there is provided an alternative wireless local area network (WLAN) transmission architecture that combines space-time block code (STBC) encoding techniques with semi-orthogonal multiple access (SOMA) schemes to improve throughput rate performance for lower signal strength data. In this alternative embodiment, a data processing module configured to digitally process and format data generated by a first and second wireless station. A SOMA encoding module operates to apply quadrature-based modulation constellation mapping to the processed data, based on data signal strength and data bit reliability, to produce SOMA modulated symbol data. A space-time block code (STBC) encoding module then operates to encode the SOMA modulated symbol data with orthogonal block codes to produce STBC-based SOMA-symbol data having time and space diversity properties.

Moreover, in a related embodiment, the disclosed embodiments provide for a methodology for transmitting data in a wireless local area network (WLAN) that combines space-time block code (STBC) encoding techniques with semi-orthogonal multiple access (SOMA) schemes to improve throughput rate performance for lower signal strength data. The transmitting method includes digitally processing and formatting the data produced by two wireless stations. The transmitting method then applies SOMA constellation quadrature encoding to the processed data and maps the data to a modulation constellation based on data signal strength and data bit reliability. The method further applies STBC encoding to block encode the SOMA modulated data with orthogonal codes to produce STBC-based SOMA-symbol data having time and space diversity properties that improve throughput performance at lower signal strength levels.

BRIEF DESCRIPTION OF THE FIGURES

The features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

As used herein, the term "about" or "approximately" refers to a +/−10% variation from the nominal value. It is to be understood that such a variation is always included in a given value provided herein, whether or not it is specifically referred to.

Unless otherwise defined, all technical and scientific terms used herein have the same meaning as commonly understood by one of ordinary skill in the art to which the described embodiments pertain.

WLAN Environment and MIMO-Based SOMA Scheme

Figure 1A:
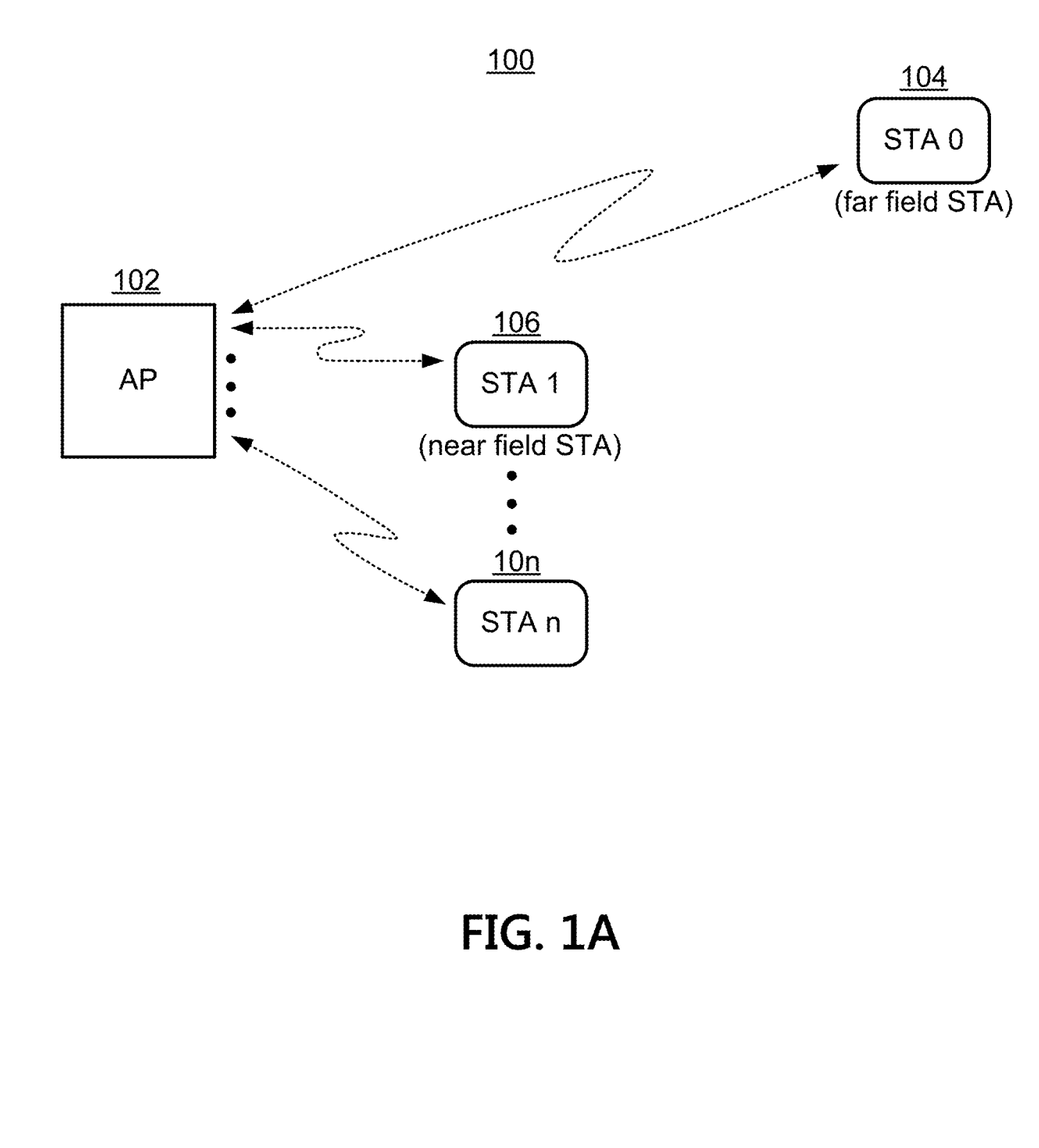
FIG. 1A depicts a high-level diagram of a representative WLAN environment.

FIG. 1A illustrates a high-level block diagram of a representative WLAN environment 100. As illustrated, WLAN environment 100 comprises a wireless access point (AP) 102 configured to wirelessly communicate with multiple wireless stations STAs (STA0-STAn) 104-10n, in accordance with current and next-generation IEEE 802.11 standards. AP 102 initiates such communications by providing signaling information indicative of communication schedule opportunities to STAs 104-10n. During the scheduled communication session, STAs 104-10n may receive and transmit data streams to and from AP 102.

It will be appreciated that in various wireless scenarios, AP 102 may be characterized as a base station, evolved NodeB (eNB), base station terminal etc., and wireless stations STAs 104-10n may be characterized as mobile stations, user equipment, client terminals, etc. Moreover, it will be understood that, although depicted AP 102 is capable of communicating with multiple STAs 104-10n, for the purposes clarity and tractability, the following descriptions will focus on communications between AP 102, a far field-situated STA0 104, and a near field-situated STA1 106. Furthermore, it will be assumed that, by virtue of its proximity to AP 102, near field STA1 106 provides a stronger signal level (i.e., higher signal-to-noise ratio (SNR)) than the far-field STA0 104 signal to AP 102.

Figure 1B:
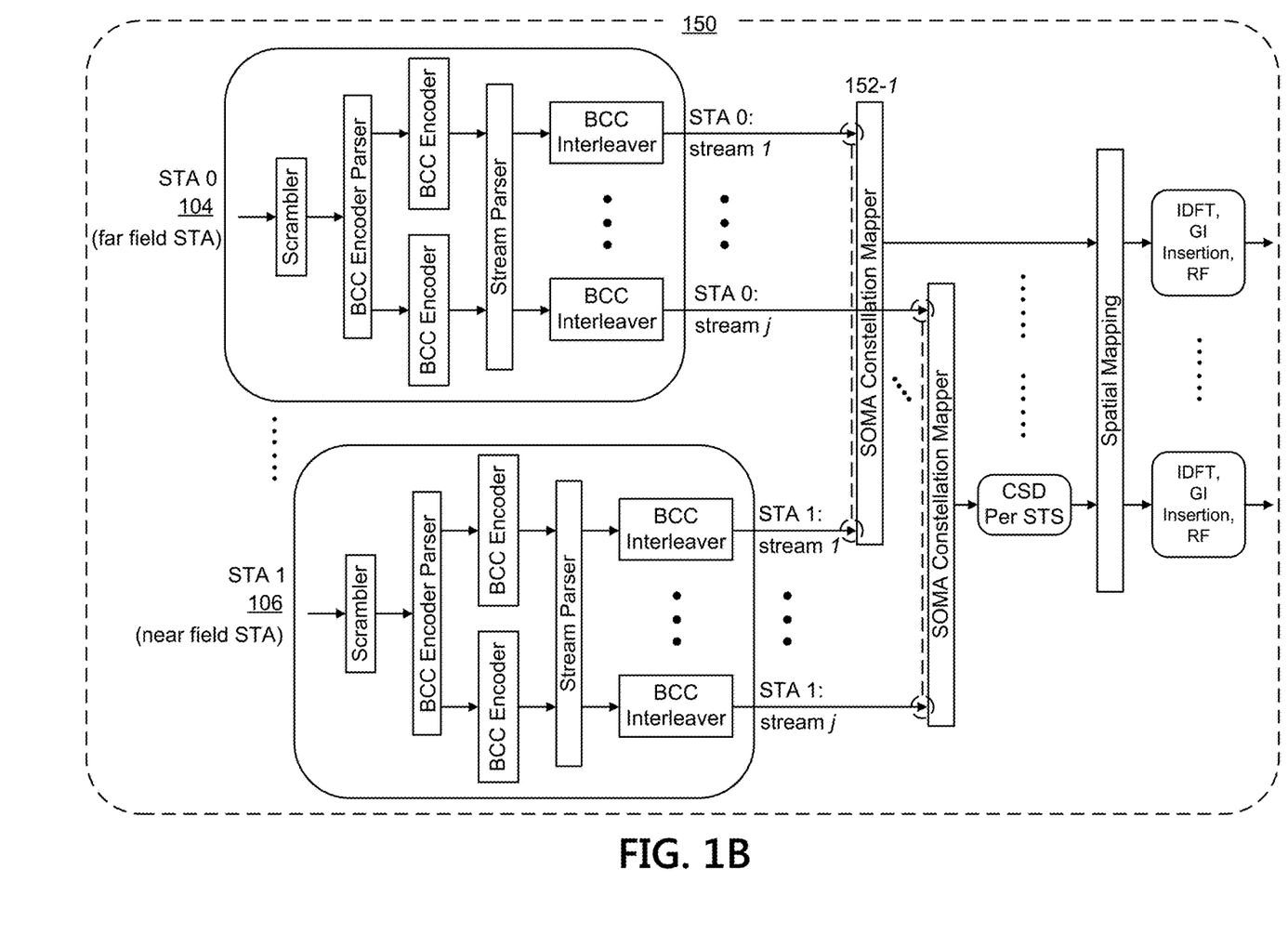
FIG. 1B depicts a high-level functional block diagram of a representative MIMO-based SOMA transmitter architecture.

Given this context, FIG. 1B depicts a high-level functional block diagram of a representative MIMO-based semi-orthogonal multiple access (SOMA) transmitter architecture 150. By way of review, the SOMA scheme exploits the notion that the weaker STA0 104 signal may not significantly interfere with the stronger STA1 106 signal. Therefore, during the processing of the stronger STA1 106 signal, the weaker STA0 104 signal is treated as an orthogonal signal. Conversely, because the stronger STA1 106 signal may have an interfering effect on the weaker STA0 104 signal, the SOMA scheme treats the stronger STA1 106 signal as a non-orthogonal signal when processing the weaker STA0 104 signal.

Moreover, in the SOMA scheme, each of the STA0 104 and STA1 106 are configured to output the same number of data streams (e.g., STA0: streams 1-j and STA1: streams 1-j). The data of each corresponding data stream 1-j of STA0 104 and STA1 106 are grouped together for QAM modulation constellation map processing.

That is, as shown in FIG. 1B, the data of the data stream 1 of far field STA0 104 is grouped with the data of the stream 1 of near field STA1 106 and supplied to the SOMA QAM constellation mapping unit 152-1. The same stream-based data grouping principle is applied to data streams 2-j of STA0 104 and STA1 106, in which the grouped data is correspondingly forwarded to SOMA QAM constellation mapping units 152-2 . . . 152-j.

The SOMA QAM constellation mapping units 152-1 . . . 152-j operate to assign and map the most reliable bits (MRBs) to the lower-SNR data (i.e., far-field STA0 104 data), and assign and map the least reliable bits (LRBs) to the higher-SNR data (i.e., near-field STA1 106 data), during QAM modulation processing. The SOMA QAM constellation mapping units 152-1 . . . 152-j incorporate bit combining and symbol mapping elements to assign the more reliable bits to the lower SNR channel to increase the probability of successful decoding. In contrast, the mapping units 152-1 . . . 152-j employ the bit combining and symbol mapping elements to assign the less reliable bits to the higher SNR channel in view of the likelihood of successful decoding due to the higher SNR.

Further details regarding SOMA-based QAM constellation modulation and mapping are provided by co-assigned U.S. Pat. No. 9,866,364, entitled "System and Method for Semi-Orthogonal Multiple Access", application Ser. No. 14/589,676, filed on Jan. 5, 2015 and issued on Jan. 9, 2018, which is hereby incorporated herein by reference.

The MIMO-based SOMA scheme described above has demonstrated improved data throughput at higher SNR signal levels. However, at lower SNR levels, there is little or no improvement in data throughput.

STBC-Based SOMA Scheme

The various embodiments of the instant disclosure are therefore directed to MIMO-based SOMA schemes that incorporate space-time block codes (STBCs) to enhance the throughput of lower signal-to-noise (SNR) WLAN signals. In keeping with the two STA scenario noted above, the ensuing disclosures provide for an STBC-based SOMA scheme that incorporates STBC block codes that may be applied to either one or both of the STAs' SOMA modulated data. In addition, an indication of the STBC-based SOMA implementation is to be included in the packet data frame structure, such as in the Extremely High Throughput (EHT) signal (SIG) field, to ensure proper processing.

STBCs are orthogonal codes that may be used to block encode wireless data. STBCs facilitate the transmission of numerous copies of the block encoded data that can be distributed across multiple spaced-apart antennas and across time to provide space and time diversity gains. By virtue of the STBC orthogonality and diversity properties, the various received versions of the encoded data may be linearly decoded to provide reliable receipt of information content.

Figure 2A:
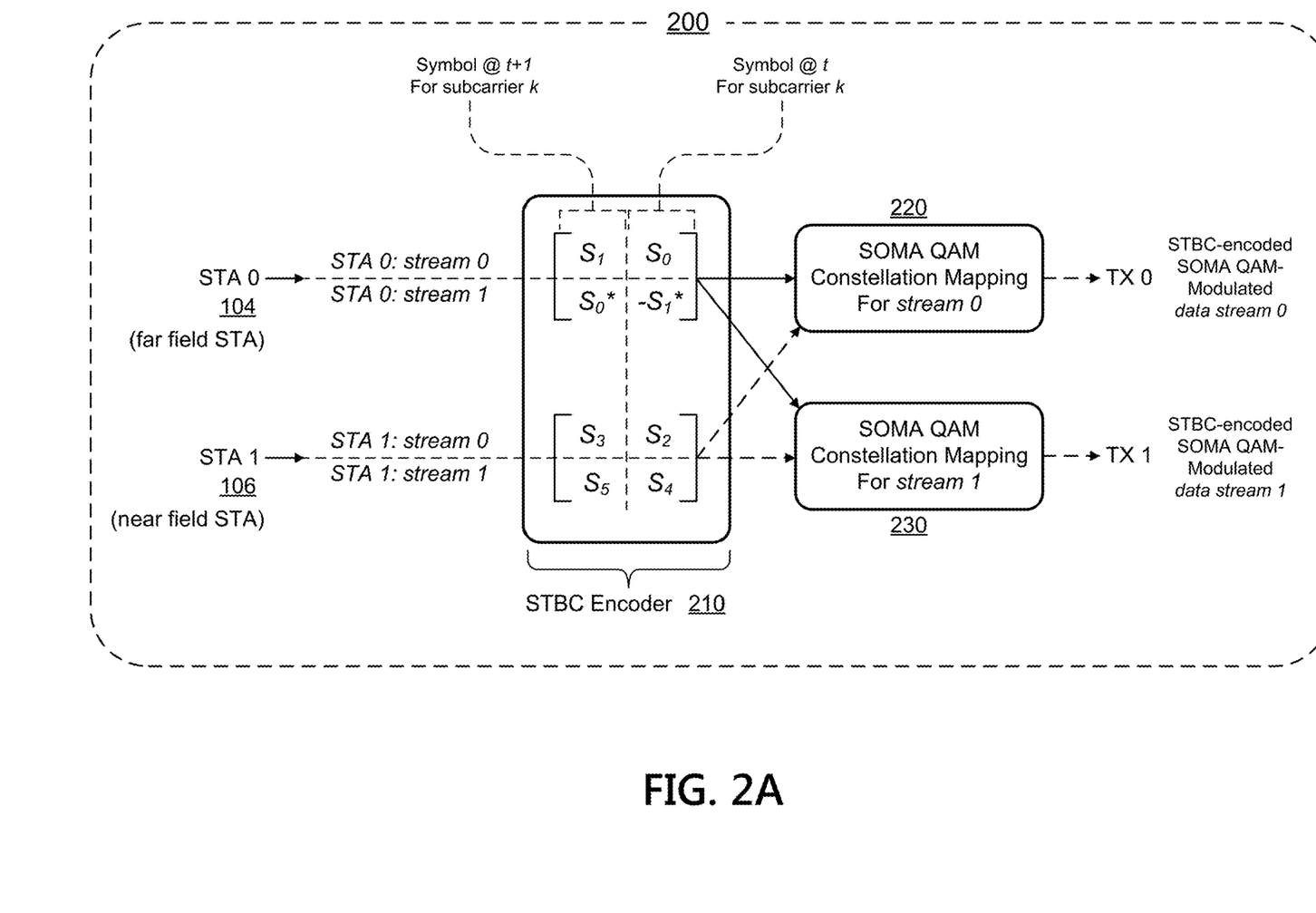
FIG. 2A depicts a high-level diagram of STBC encoding of modulated data streams, in accordance with various embodiments of the present disclosure.

FIG. 2A depicts the STBC encoding process 200 of modulated data streams, in accordance with various embodiments of the present disclosure. The encoding operations depicted by FIG. 2A illustrate the application of STBC-encoding for two lower-SNR data streams 0 and 1 of far-field STA0 104. It will be understood, however, that the described STBC-block encoding scheme may be applied to the data streams of either STA0 104 or STAT 106 or to both, in accordance with the concepts and principles embodied by the instant disclosure.

FIG. 2A indicates that STBC encoder module 210 operates to apply symbols $S_0$, $S_0^*$, $S_1$, and $-S_1^*$ to the lower-SNR data streams 0 and 1 of far-field STA0 104. As noted above, STBC encoder module 210 may optionally be applied to the higher-SNR data streams 0 and 1 of near-field STA1 106 (as indicated by the dashed arrows in FIG. 2A and symbols $S_2$, $S_3$, $S_4$, and $S_5$). Therefore, although the following disclosures describe the application of STBC symbols to the lower-SNR data streams of far-field STA0 104, it will be understood that the STBC symbols may be equally applied to the higher-SNR data streams of near-field STA1 106 or to both STA0 104 and STA1 106.

As shown, STBC encoder module 210 encodes 2 symbols in a pair across the data streams 0 and 1 for STA0 104 along two time slots t and t+1. The STBC encoded stream 0 of STA0 104 are grouped and forwarded to the SOMA QAM constellation map processing module 220 of stream 0, as noted above. Similarly, the STBC encoded stream 1 of STA0 104 are grouped and forwarded to the SOMA QAM constellation map processing module 230 of stream 1.

For the case in which only the lower-SNR data streams 0 and 1 of far-field STA0 104 are subjected to STBC encoding, the transmission rate of STA0 104 will be half of the transmission rate of STA1 106. After the STBC encoding is applied to STA0 104, the bit level information may be pulled back. The SOMA QAM constellation processing module 230 then operates to apply SOMA QAM mapping to each stream and to each sub-carrier for the corresponding symbols.

Figure 2B:
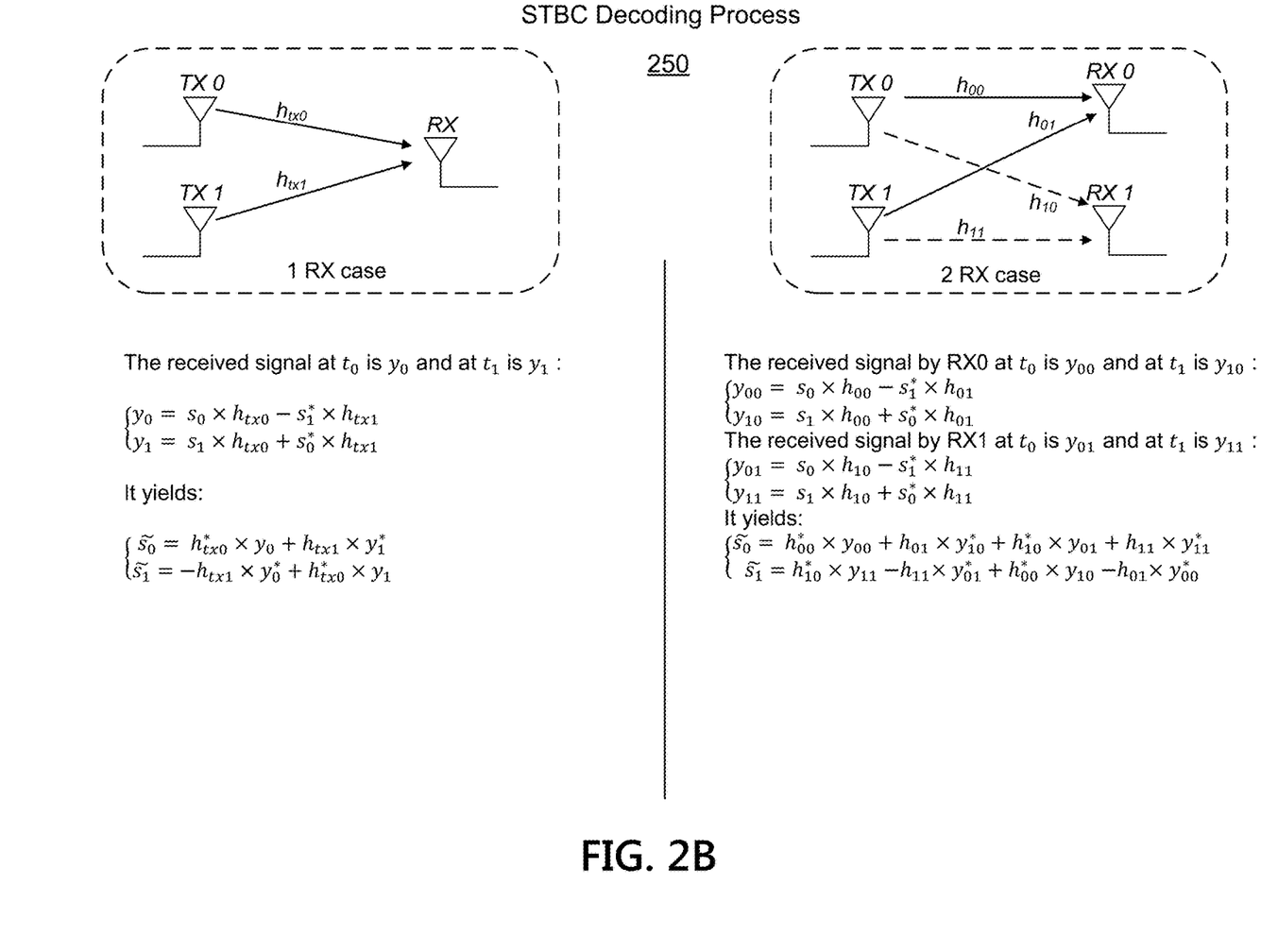
FIG. 2B depicts a high-level diagram of STBC decoding of modulated data streams, in accordance with various embodiments of the present disclosure.

FIG. 2B depicts the STBC decoding process 250 of modulated data streams 200, in accordance with various embodiments of the present disclosure. As shown for the single receiver case, the received signal at receiver RX at $t_0$ is $y_0$ and at $t_1$ is $y_1$, which may be expressed as:

$$y_0 = s_0 \times h_{tx0} - s_1^* \times h_{tx1}$$

$$y_1 = s_1 \times h_{tx0} - s_0^* \times h_{tx1}$$

where $h_{tx0}$ and $h_{tx1}$ are the channel gains between TX0 and RX and between TX1 and RX, respectively and $s_0$, $s_0^*$, $s_1$, and $-S_1^*$ are the transmitted signals. Based on the received signals $y_0$ and $y_1$, the transmitted signals may be decoded by:

$$\widetilde{S}_0 = h^*_{tx0} \times y_0 + h_{tx1} \times y^*_1$$

$$\widetilde{S}_1 = -h^*_{tx1} \times y^*_0 + h^*_{tx0} \times y_1$$

For the two receiver case, the received signal at receiver RX0 at time $t_0$ is $y_{00}$ and at time $t_1$ is $y_{11}$. Similarly, the received signal at receiver RX1 at time $t_0$ is $y_{01}$ and at time $t_1$ is $y_{11}$. The received signals $y_{00}$, $y_{10}$, $y_{01}$, and $y_{11}$ may be expressed as follows:

$$y_{00} = s_0 \times h_{00} - s_1^* \times h_{01}$$

$$y_{10} = s_1 \times h_{00} - s_0^* \times h_{01}$$

$$y_{01} = s_0 \times h_{10} - s_1^* \times h_{11}$$

$$y_{11} = s_1 \times h_{10} - s_0^* \times h_{11}$$

where $h_{00}$ and $h_{01}$ are the channel gains between TX0-RX0 and TX1-RX0, and $h_{10}$ and $h_{11}$ are the channel gains between TX0-RX1 and TX1-RX1. The transmitted signals are $s_0$, $s_0^*$, $s_1$, and $-s_1^*$. Based on the received signals $y_{00}$, $y_{10}$, $y_{01}$, and $y_{11}$ the transmitted signals may be decoded by:

$$\widetilde{S}_0 = h^*_{00} \times y_{00} + h_{01} \times y^*_{10} + h^*_{10} \times y_{01} + h_{11} \times y^*_{11}$$

$$\widetilde{S}_1 = h^*_{10} \times y_{11} + h_{11} \times y^*_{01} + h^*_{00} \times y_{10} + h_{01} \times y^*_{00}$$

STBC-Based Pre-SOMA Transmitting Architecture

Figure 3A:
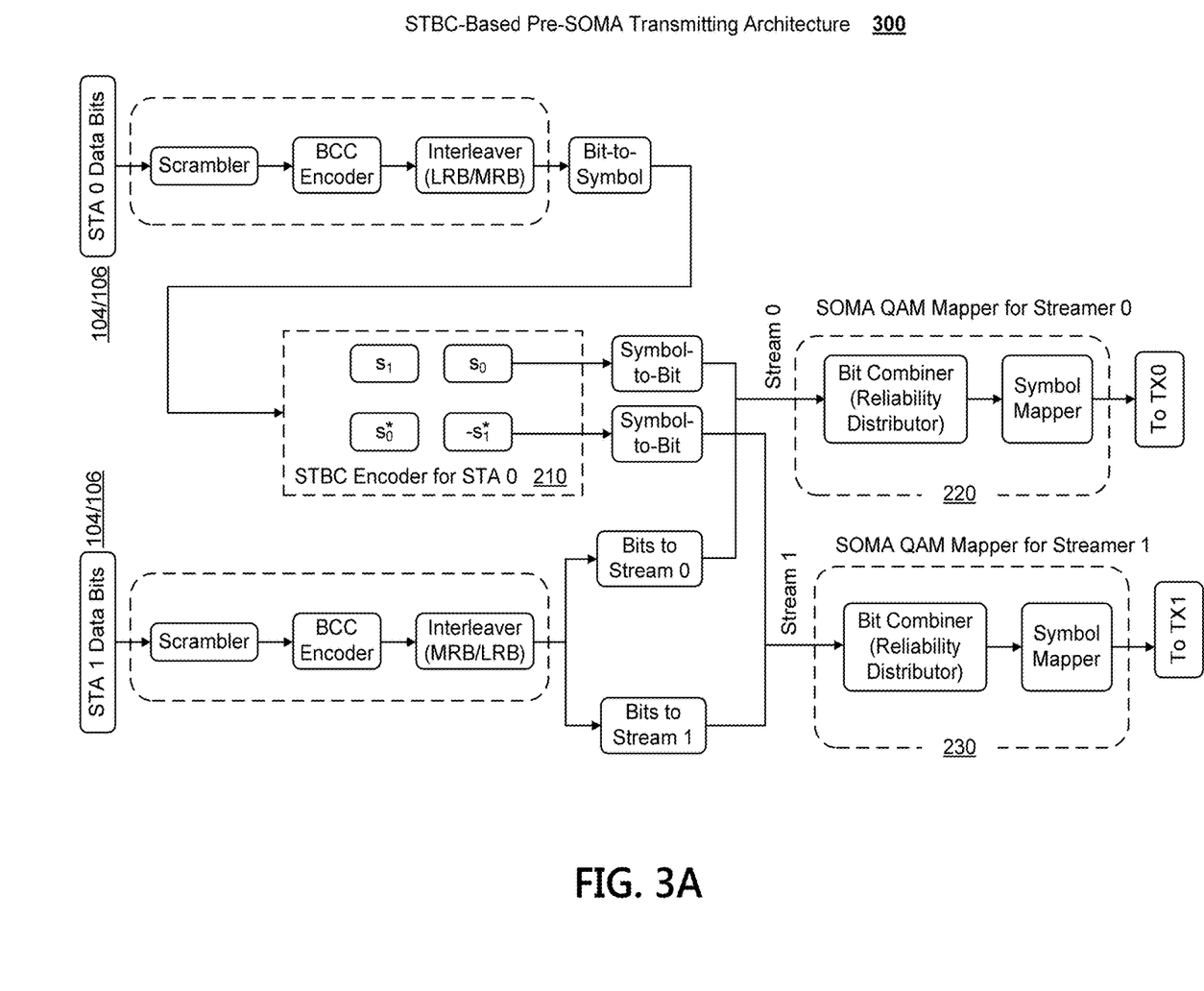
FIG. 3A depicts a high-level functional block diagram of an STBC-based pre-SOMA scheme transmitting architecture, in accordance with various embodiments of the present disclosure.

FIG. 3A illustrates a high-level functional block diagram of a representative STBC-based pre-SOMA scheme transmitting architecture 300, in accordance with various embodiments of the present disclosure. As shown, the STBC encoding operations 210 are performed prior to the SOMA QAM constellation map processing 220, 230.

Moreover, in the depicted embodiment, the higher-SNR data of near-field STA1 106 are not STBC-encoded for purposes of simplicity. However, it will be appreciated that the STBC encoding may also be applied to the STA1 106 data, consistent with the concepts and principles presented by the instant disclosure. Therefore, it will be understood that STBC encoding operations may be applied to the data of either of the near-field or far-field STAs or to both.

As shown, transmitting architecture 300 digitally processes and formats the data bits of lower-SNR data streams 0 and 1 of far-field STA0 104 and higher-SNR data streams 0 and 1 of near-field STA1 106 for subsequent processing. In particular, the data bits corresponding to streams 0 and 1 of both STAs are scrambled, binary convolutionally encoded, and are correspondingly interleaved according to bit reliability (e.g., least reliable bits (LRBs) and most reliable bits (MRBs) respectively allocated for STA0 104, STA1 106).

The interleaved bits of STA0 104 are subsequently converted to symbols to facilitate STBC encoding. However, because in the illustrated embodiment the STA1 106 data is not subjected to STBC encoding, the interleaved bits of STA1 106 are not converted to symbols.

Transmitting architecture 300 subsequently supplies the processed lower-SNR data symbols of far-field STA0 104 to STBC encoder module 210. As noted above, STBC encoder module 210 operates to block encode the STA0 104 data with symbols $S_0$, $S_0^*$, $S_1$, and $-S_1^*$ to provide space and time diversity gains.

Returning to FIG. 3A, the STBC-encoded STA0 104 stream 0 data bits are grouped with the STA1 106 stream 0 data bits and the STBC-encoded STA0 104 stream 1 data bits are grouped with the STA1 106 stream 1 data bits. The grouped stream 0 and stream 1 data bits are the forwarded to the respective stream 0 and stream 1 SOMA QAM constellation map processing modules 220, 230 which, as noted above, serves to provide a higher throughput by assigning and mapping MRBs and LRBs to the various streams. That is, SOMA QAM constellation map processing modules 220, 230 employ bit combining and symbol mapping elements that operate to assign the MRBs to the lower SNR data and to assign LRBs to the higher SNR data. The STBC-based SOMA modulated symbols of data streams 0, 1 are subsequently forwarded to respective transmission antenna units for wireless transmission.

As noted above, an indication of the application of STBC operations to the SOMA modulated data is to be included in the communicated data packet frame structure, preferably in a signal (SIG) field, such as, for example, the Extremely High Throughput (EHT) SIG field, to enable recognition of STBC encoding and ensure proper processing.

STBC-Based Post-SOMA Transmitting Architecture

Figure 3B:
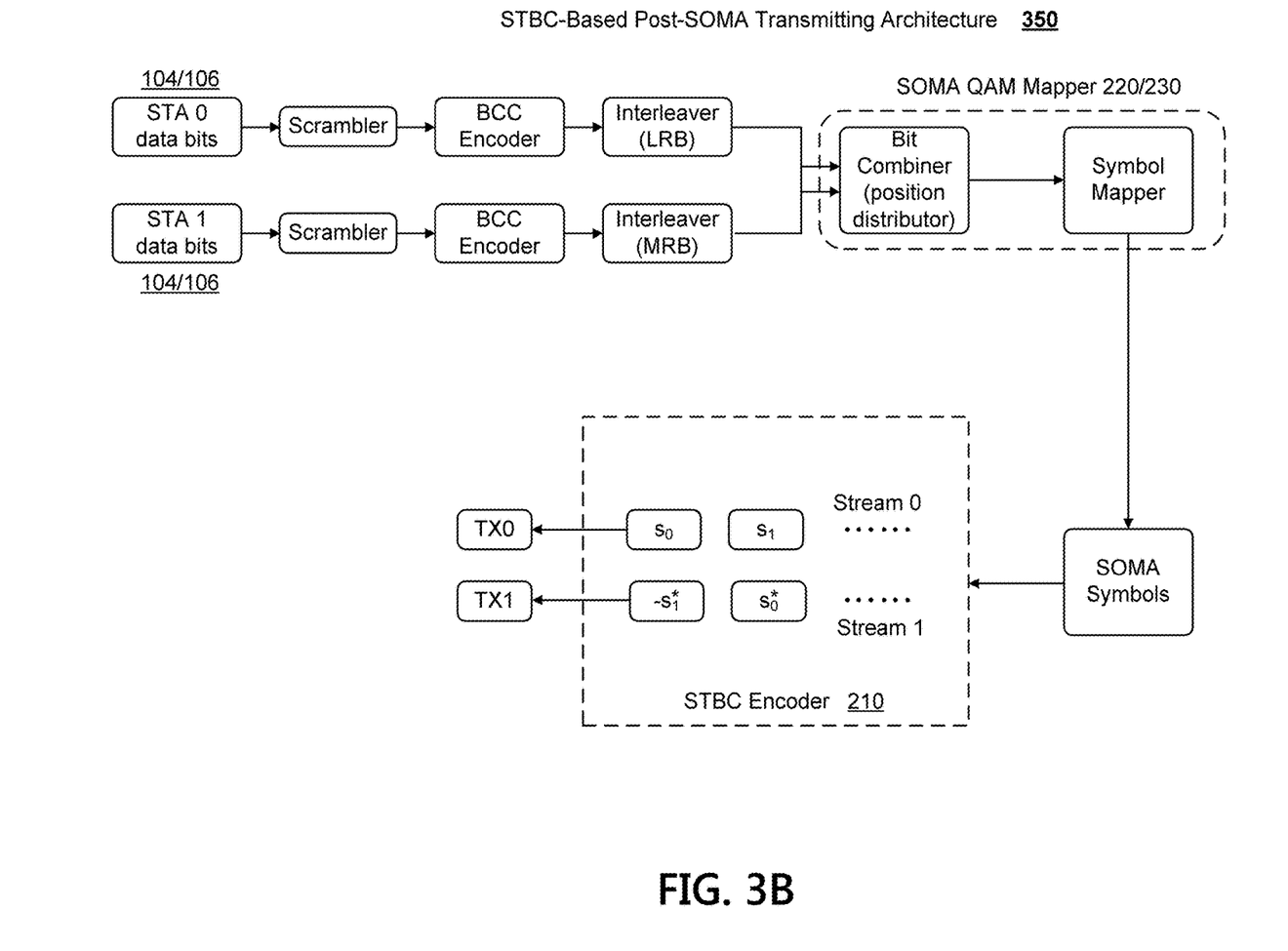
FIG. 3B depicts a high-level functional block diagram of an STBC-based post-SOMA scheme transmitting architecture, in accordance with various embodiments of the present disclosure.

As an alternative implementation, FIG. 3B depicts a high-level functional block diagram of a representative post-SOMA STBC-based transmitting architecture 350, in accordance with various embodiments of the present disclosure. As shown, STBC-encoding operations are performed after the SOMA QAM constellation map processing 220, 230 and are applied to the SOMA modulated data of both STAs.

Specifically, the data bits of both, lower-SNR data streams 0 and 1 of far-field STA0 104 and higher-SNR data streams 0 and 1 of near-field STA1 106 are digitally processed and formatted for subsequent processing. That is, the data bits are scrambled, binary convolutionally encoded and correspondingly interleaved according to bit reliability (e.g., LRBs and MRBs respectively allocated to STA0 104, STA1 106 stream data).

In turn, the processed interleaved data bits of streams 0 and 1 corresponding to STA0 104 and STA1 106 are forwarded to the SOMA-QAM constellation map processing modules 220, 230. The interleaved data bits of both streams for STA0 104 and STA1 106 are processed by QAM constellation modulation processing modules 220, 230 that serve to modulate, assign, and correspondingly map LRBs and MRBs to achieve better throughput, as described above. That is, SOMA QAM constellation map processing modules 220, 230 employ bit combining and symbol mapping elements to assign the MRBs to the lower SNR data and to assign the LRBs to the higher SNR data.

Turning back to FIG. 3B, the SOMA-QAM modulated data of far-field STA0 104 (and/or near-field STA1 106) may then be supplied to STBC-encoding module 210 which, as noted above, operates to block encode the STA0 104 (and/or near-field STA1 106) data with symbols $S_0$, $S_0^*$, $S_1$, and $-S_1^*$ to provide space and time diversity gains. The STBC-based SOMA modulated symbols of data streams 0, 1 are subsequently forwarded to respective transmission antenna units for wireless transmission.

Moreover, as noted above, an indication of STBC operations applied to the SOMA modulated data is to be included in the communicated data packet frame structure, preferably in the Extremely High Throughput (EHT) signal (SIG) field, to enable recognition of STBC encoding and ensure proper processing.

STBC-Based SOMA Processes

Figure 4A:
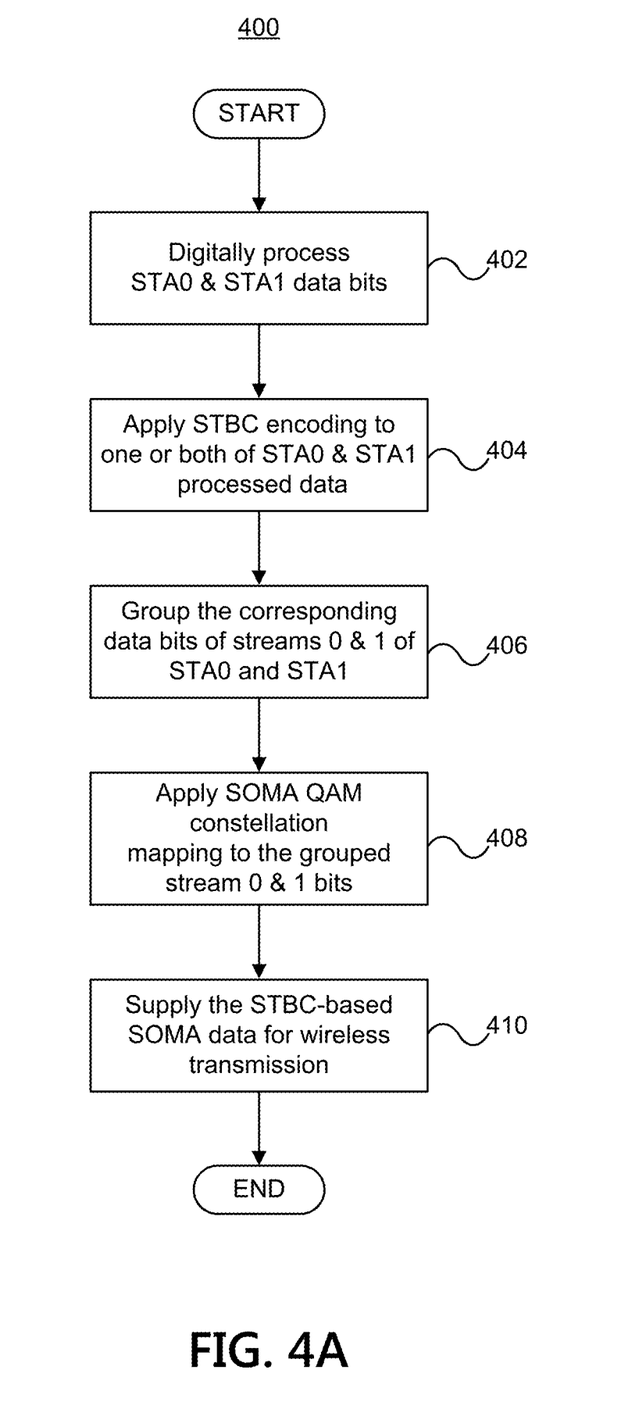
FIG. 4A depicts a high-level flow diagram of an STBC-based pre-SOMA scheme transmitting process, in accordance with various embodiments of the present disclosure.

FIG. 4A illustrates a high-level flow diagram of a representative STBC-based pre-SOMA scheme transmitting process 400 that may be executed by transmitting architecture 300, in accordance with various embodiments of the present disclosure. It will be appreciated that the processing tasks may be achieved by constituent structures, components, and modules of transmitting architecture 300 or combinations thereof and do not limit the scope of the present disclosure.

Process 400 commences at task block 402, in which transmitting architecture 300 digitally processes and formats the STA0 104 and STA1 106 data bits for subsequent processing. As described above, the digital processing of task block 402 includes scrambling, binary convolutionally encoding, and interleaving LRB/MRB operations.

At task block 404, transmitting architecture 300 applies STBC encoding to one or both of the STA0 104 and STA1 106 data. In particular, STBC encoder 210 operates to block encode the STA0 104 data with symbols $S_0$, $S_0^*$, $S_1$, and $-S_1^*$ to provide space and time diversity gains.

At task block 406, transmitting architecture 300 groups the STBC-encoded bits of corresponding streams 0, 1 of STA0 104, STA1 106 data. As noted above, the STBC-encoded STA0 104 stream 0 data bits are grouped with the STA1 106 stream 0 data bits and the STBC-encoded STA0 104 stream 1 data bits are grouped with the STA1 106 stream 1 data bits.

At task block 408, transmitting architecture 300 applies SOMA QAM constellation mapping to the grouped stream 0 and stream 1 data bits. As discussed above, SOMA QAM constellation mapping incorporates bit combining and symbol mapping elements to assign and map MRBs to lower-SNR stream data, and assign and map LRBs to the higher-SNR stream data during QAM modulation processing. At task block 410, the STBC-based SOMA data symbols of streams 0, 1 are subsequently forwarded to respective transmission antenna units for wireless transmission.

Figure 4B:
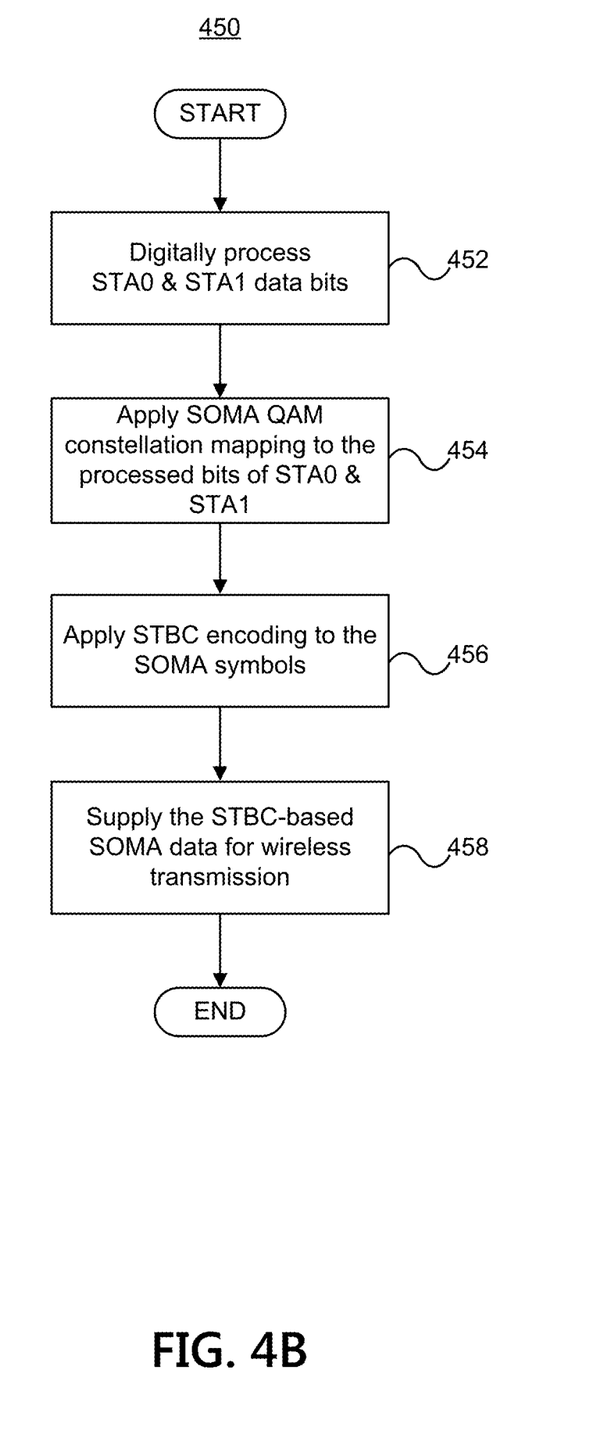
FIG. 4B depicts a high-level flow diagram of an STBC-based post-SOMA scheme transmitting process, in accordance with various embodiments of the present disclosure.

In an alternative implementation, FIG. 4B illustrates a high-level flow diagram of a representative STBC-based post-SOMA scheme transmitting process 450 that may be executed by transmitting architecture 350, in accordance with various embodiments of the present disclosure.

Process 450 commences at task block 452, in which in which transmitting architecture 350 digitally processes and formats the STA0 104, STA1 106 data bits for subsequent processing. As described above, the digital processing includes scrambling, binary convolutionally encoding, and interleaving LRB/MRB operations.

At task block 454, transmitting architecture 350 applies SOMA QAM constellation mapping to the digitally processed bits of STA0 104 and STA1 106, which operates to modulate and assign/map MRBs, LRBs to the stream data, in the manner described above.

At task block 456, transmitting architecture 350 applies STBC encoding to the SOMA symbols. The STBC encoding operates to block encode the SOMA symbols for space and time diversity gains, in the manner described above. At task block 458, the STBC-based SOMA data symbols of streams 0, 1 are subsequently forwarded to respective transmission antenna units for wireless transmission.

Representative Simulation Results of STBC-Based SOMA Scheme

Figure 5A:
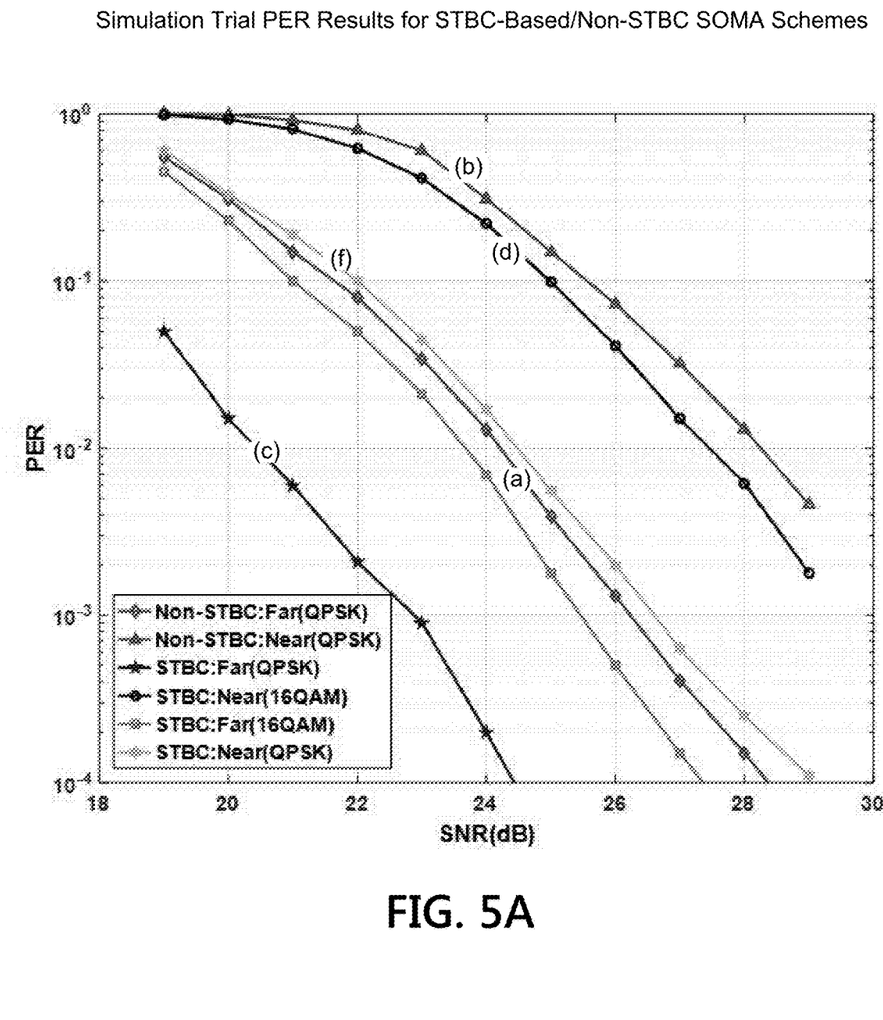
FIG. 5A illustrates relative packet error rates for STBC-based and non STBC-based SOMA schemes, in accordance with various embodiments of the present disclosure.

FIG. 5A illustrates the simulation trial packet error rate (PER) results for various STBC-based and non STBC-based SOMA scenarios, in accordance with various embodiments of the present disclosure. In particular, FIG. 5A indicates the simulation PER results for the following trial scenarios: (a) non STBC-based SOMA far-field STA QPSK modulated signal; (b) non STBC-based SOMA near field STA QPSK modulated signal; (c) STBC-based SOMA far-field STA QPSK modulated signal; (d) STBC-based SOMA near-field STA QPSK modulated signal; (e) STBC-based SOMA far-field STA 16QAM modulated signal; and (f) STBC-based SOMA near-field STA QPSK modulated signal.

In view of the simulation trial PER results indicated by FIG. 5A, it will be appreciated that, at low SNR levels, the STBC-based SOMA far-field STA QPSK modulated signal (indicated by curve (c)) and the STBC-based SOMA far-field STA 16QAM modulated signal (indicated by curve (e)) exhibit better PER performance than the other trial scenarios.

Figure 5B:
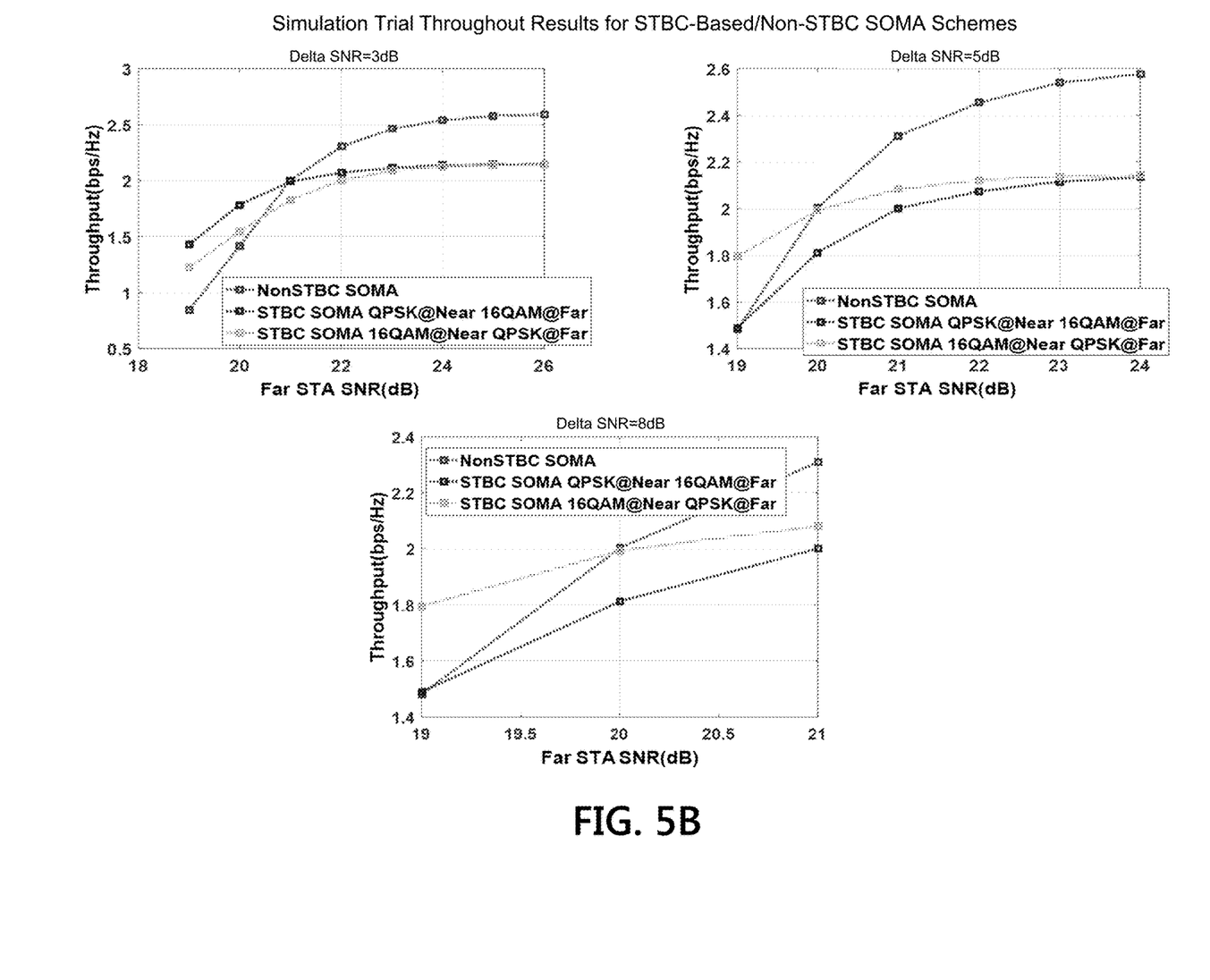
FIG. 5B illustrates relative throughput results for STBC-based and non STBC-based SOMA schemes, in accordance with various embodiments of the present disclosure.

FIG. 5B illustrates the simulation trial throughput results for various STBC-based and non STBC-based SOMA scenarios, in accordance with various embodiments of the present disclosure. In particular, FIG. 5B indicates the simulation throughput results for the following trial scenarios: (a) non STBC-based SOMA; (b) STBC-based SOMA with QPSK modulated at a near-field STA and 16QAM modulation at a far field STA; and (c) STBC-based SOMA with 16QAM modulation at a near-field STA and QPSK modulation at a far-field STA for different SNR gaps.

The simulation trial throughput results, as evidenced by FIG. 5B, indicate that the throughput of STBC-based SOMA with 16QAM modulation at a near-field STA and QPSK modulation at a far-field STA (indicated by curve (c)) consistently outperforms the throughput of non STBC-based SOMA (indicated by curve (a)) at lower SNR levels. Therefore, although the throughput performance of non STBC-based SOMA is better at higher SNR levels, the STBC-based SOMA scheme provides better throughput performance at lower SNR levels due to diversity gain effects.

The disclosed embodiments therefore provide for a WLAN transmitting architecture and transmission process that combines STBC encoding techniques with SOMA modulation schemes that are configured to improve the throughput of WLAN signals at lower SNR levels. As detailed above, the STBC encoding techniques may be applied to SOMA-modulated data of a single STA or a combination of STAs, in accordance with the disclosed embodiments.

It will be understood that the operations and functionality of the described WLAN transmitting architecture, processes, and/or constituent structures and elements may be achieved by hardware-based, software-based, firmware-based elements and/or combinations thereof. Such operational alternatives do not, in any way, limit the scope of the present disclosure.

It will also be understood that, although the inventive concepts and principles presented herein have been described with reference to specific features, structures, and embodiments, it is clear that various modifications and combinations may be made without departing from the disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

What is claimed is:

1. A wireless local area network (WLAN) communication device, comprising:
   a data processing module configured to digitally process first data for a first wireless station (STA) and second data for a second wireless station (STA);
   a space-time block code (STBC) encoding module operative to receive and encode the processed first data to produce first orthogonal block-encoded symbol data;
   a semi-orthogonal multiple access (SOMA) encoding module configured to apply quadrature-based modulation constellation mapping to the first orthogonal block-encoded symbol data and to the processed second data, to produce STBC-based SOMA-symbol data; and
   a communication module configured to transmit the STBC-based SOMA-symbol data to the first and second STAs.

2. The WLAN communication device of claim 1, wherein the STBC encoding module operates to digitally process the first data by scrambling the data, binary convolutionally encoding the scrambled data, and interleaving the binary convolutionally-encoded data.

3. The WLAN communication device of claim 1, wherein the STBC encoding module operates to block encode the processed first data with two orthogonal symbols within two consecutive time intervals.

4. The WLAN communication device of claim 1, wherein the SOMA encoding module is configured to apply quadrature amplitude modulation (QAM) to the first orthogonal block-encoded symbol data and the processed second data.

5. The WLAN communication device of claim 1, wherein the first data have a lower signal-to-noise ratio (SNR) level than the second data.

6. The WLAN communication device of claim 5, wherein the SOMA encoding module operates to assign and map most reliable bits (MRBs) to the first data and assign and map least reliable bits (LRBs) to the second data.

7. The WLAN communication device of claim 1, wherein an indication of the STBC-based SOMA data symbol format is included in a signal (SIG) field of a communicated data packet frame structure.

8. The WLAN communication device of claim 7, wherein the indication of the STBC-based SOMA data symbol format is included in an Extremely High Throughput (EHT) SIG field of the communicated data packet frame structure.

9. The WLAN communication device of claim 1, wherein STBC encoding is applied only to the processed first data of the first STA.

10. The WLAN communication device of claim 1, wherein STBC encoding is applied to the processed second data.

11. A method for communicating data in a wireless local area network (WLAN), comprising:
    digitally processing first data for a first wireless station (STA) and second data for a second wireless station (STA);
    encoding the processed first data of the first STA with a space-time block code (STBC) to produce first orthogonal block-encoded symbol data;
    applying semi-orthogonal multiple access (SOMA) encoding configured to apply quadrature-based modulation constellation mapping to the first orthogonal block-encoded symbol data and to the processed second data to produce STBC-based SOMA-symbol data; and
    transmitting the STBC-based SOMA-symbol data to the first and second STAs.

12. The WLAN communication method of claim 11 wherein the digitally processing of the first data includes digitally scrambling the data, binary convolutionally encoding the scrambled data, and interleaving the binary convolutionally-encoded data.

13. The WLAN communication method of claim 11, wherein the STBC encoding includes block encoding the processed first data with two orthogonal symbols within two consecutive time intervals.

14. The WLAN communication method of claim 11, wherein the SOMA encoding includes applying quadrature amplitude modulation (QAM) to the first orthogonal block-encoded symbol data and the processed second data.

15. The WLAN communication method of claim 11, wherein the first data have a lower signal-to-noise ratio (SNR) level than the second data.

16. The WLAN communication method of claim 11, wherein the SOMA encoding assigns and maps most reliable bits (MRBs) to the first data and assigns and maps least reliable bits (LRBs) to the second data.

17. The WLAN communication method of claim 11, wherein an indication of the STBC-based SOMA data symbol format is included in a signal (SIG) field of a communicated data packet frame structure.

18. The WLAN communication method of claim 17, wherein the indication of the STBC-based SOMA data symbol format is included in an Extremely High Throughput (EHT) SIG field of the communicated data packet frame structure.

19. The WLAN communication method of claim 11, wherein the STBC encoding is applied only to the processed first data.

20. The WLAN communication method of claim 11, wherein the STBC encoding is applied to the processed second data.

* * * * *